Jan. 20, 1970  D. M. OLSON  3,490,248
UNITIZED AIR CONDITIONER AND AIR-COOLING SYSTEM
Filed Jan. 19, 1968  2 Sheets-Sheet 1
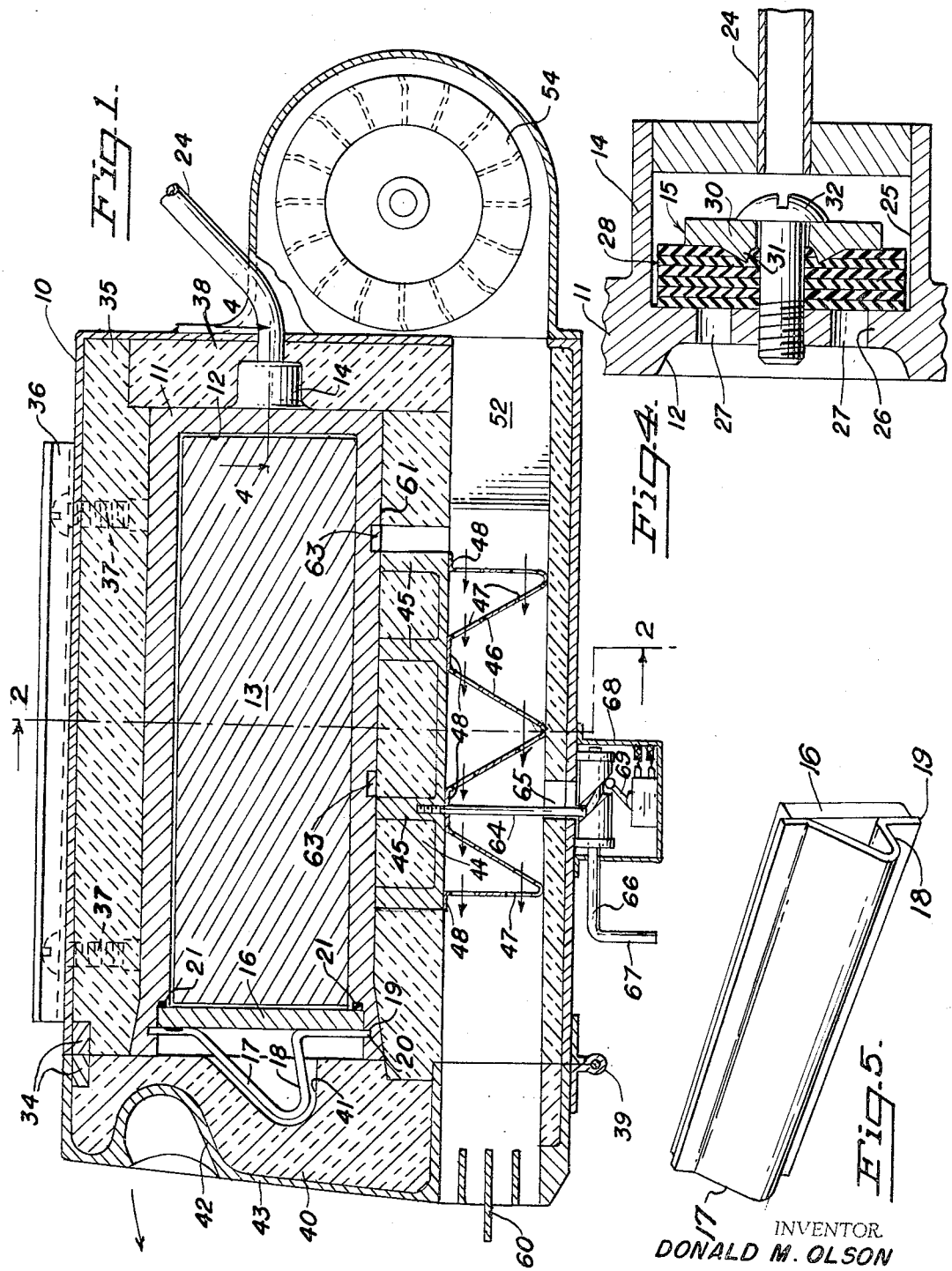
INVENTOR.
DONALD M. OLSON
BY
Owen, Wickersham & Erickson
ATTORNEYS

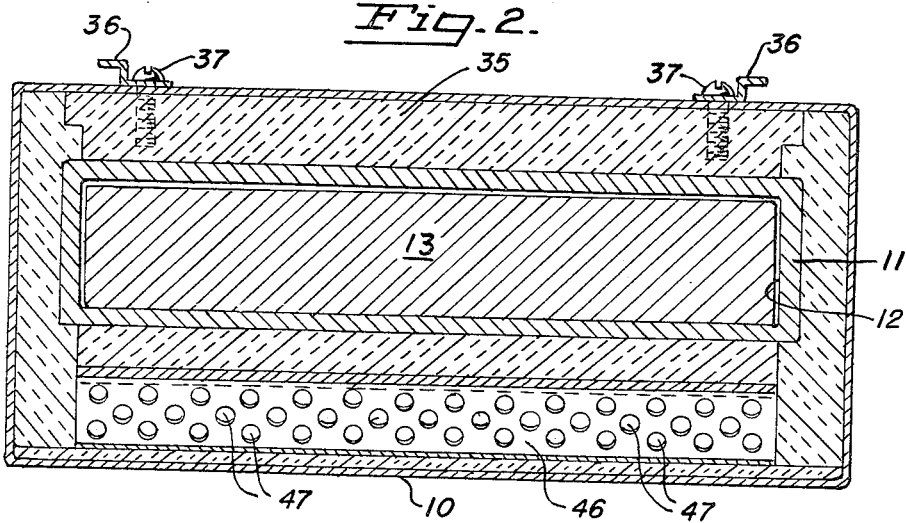
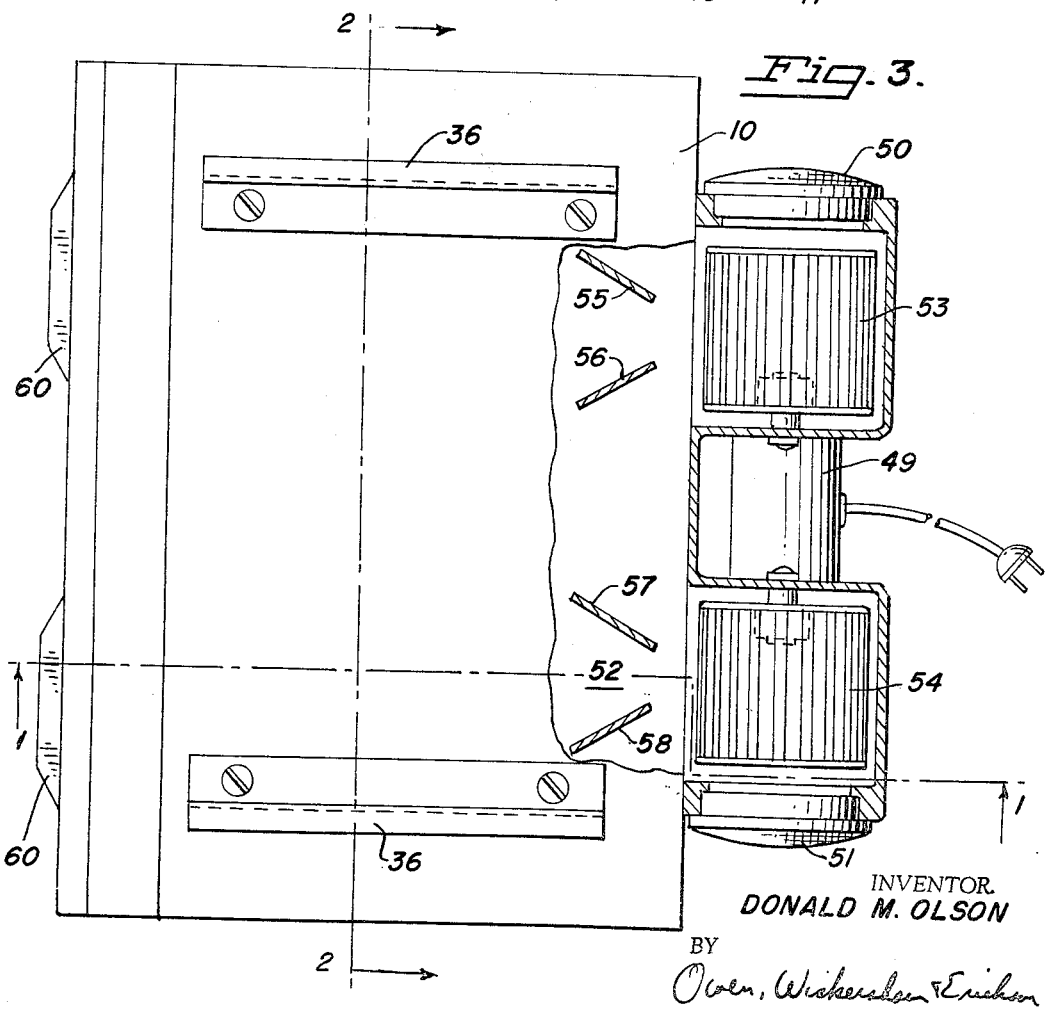

United States Patent Office 3,490,248
Patented Jan. 20, 1970

3,490,248
UNITIZED AIR CONDITIONER AND
AIR-COOLING SYSTEM
Donald M. Olson, Oakland, Calif., assignor to Data-Veyors Corporation, Oakland, Calif., a corporation of California
Filed Jan. 19, 1968, Ser. No. 699,160
Int. Cl. F25d 3/12
U.S. Cl. 62—166                                3 Claims

ABSTRACT OF THE DISCLOSURE

A unitized air-conditioner and air-cooling system for an enclosed space, having a pressure vessel in and spaced from an outer housing and containing a block of Dry Ice or other solid refrigerant that sublimates and having a pressure-relief valve for release of gas under pressure as the Dry Ice (or other solid refrigerant) sublimates. A conduit leads from the valve outside said space. Insulation in the outer housing surrounds the pressure vessel and defines a passageway, and a metal web system of metal members is connected to the pressure vessel in variable heat-conductive relation thereto for controlled conduction and heat exchange in the passageway. Blowers at one end of the housing have an inlet filter and send filtered air through the passageway to cool the air by heat exchange.

---

This invention relates to a unitized air conditioner and cooling system.

Air conditioning systems for automobiles have tended to be quite expensive and difficult to install in cars not made with them, and they have been awkward, their taking up a large amount of room and occupying undesirable positions. They have required a significant consumption of power from the automobile. Many of them have not been very effective when the car is standing still and the air conditioner is running.

Among the objects of the present invention are to provide a simple, compact, economical and effective and efficient air cooling and air conditioning system which can be used in all automobiles, as well as in other environments.

Basically, the invention relies on the use of a very cold solid which sublimates, preferably so-called Dry Ice, solidified carbon dioxide. The invention is characterized by not sending any of the unwanted effluent, such as carbon dioxide gas, into the atmosphere in the car or into the system being cooled; instead, it conducts this gas elsewhere. Another significant feature of the invention is that a relatively small amount of carbon dioxide is used per hour, its cooling power being transmitted through a novel heat exchange system to a stream of filtered air. Very low-power blowers may be used to circulate and cool the filtered area, so that the device has a very low consumption of electricity compared to prior-art air conditioning units that have required a great deal of power in order to perform just the cooling function. The invention also provides for controlled sublimation of the cooling block of solid carbon dioxide or other similar refrigerant for controlled use of its cooling power and for its retention under various pressures.

Other objects and advantages of the invention will appear from the following description of a preferred form thereof.

In the drawings:
FIG. 1 is a view in elevation and in section of a device embodying the principles of the invention, taken along the line 1—1 in FIG. 3.

FIG. 2 is a view in section on a reduced scale taken along the line 2—2 in FIG. 1.

FIG. 3 is a top view on a reduced scale with a portion broken away and shown in section.

FIG. 4 is an enlarged fragmentary view in detail taken along the line 4—4 in FIG. 1.

FIG. 5 is a view in perspective of the door and its spring latch.

The invention comprises a housing 10 which encloses the whole device and within which is an inner pressure vessel 11 and defining an interior space 12 which is preferably shaped as a rectangular parallelepiped for installation of a block 13 of carbon dioxide in solid form. At one end of the vessel 11, preferably, is a fitting 14 with an exhaust pressure-relief valve 15 (FIG. 4), which will be described later, and at the other end of the vessel 11 is a door 16. The door 16 may be held locked in its closed position by a spring latch 17 which has a gripping portion 18 that is squeezed up in order to release a latching edge 19 from a recess 20, so that the door 16 can be removed from the vessel 11. O-ring 21 may both insulate the door closure and seal it so that the vessel 11 can retain the needed pressure. The vessel 11 may be metal or strong plastic, such as Zytel or nylon, with one wall metallized or a metal plate or otherwise made conductive. In the form of the invention shown, the bottom wall is the one that needs some conductive means.

In this invention, the carbon dioxide is preferably kept under pressure, with the valve 15 providing for a constant leak rate at substantially constant pressure. In other words, the heating of the block 13 of carbon dioxide causes sublimation, which causes a rise in pressure in the vessel 11, and the rise in pressure actuates the valve 15 at a certain controlled pressure level to provide for constant leaking at that rate. The gas is then conducted out through an exhaust hose 24 and discharged outside the automobile or other area where the device is used. As shown in FIG. 4, the valve 15 preferably comprises a cylindrical housing 25 with a closed end or seat 26 having a few equally spaced holes 27. A medium hard elastomer 28 may be held down against the seat 26 by a retaining washer 30, preferably having a bite-in portion 31, and a bolt 32 which causes the elastomer 28 to expand outwardly. The pressure with which the elastomer 28 is kept seated and held determines the pressure of the retention of the carbon dioxide gas and is easily adjusted at the factory.

Between the pressure vessel 11 and the housing 10 is a thick layer of insulating material 35 such as polyurethane foam or polystyrene foam which is retained by the cooperation of the two housings 10 and 11. The material 35 preferably completely surrounds the pressure vessel 11 except in some predetermined areas. Mounting brackets 36 on the housing 10 may be secured by bolts 37 that go directly into the pressure vessel 11 and help to space it properly from the housing 10. An end insulating portion 38 may surround the valve 14, a bottom insulating portion 44 may be on the bottom of the vessel 11 and another insulating portion 40 may surround the door 16 and be provided with an inner recess 41 to receive the spring opening member 17 and an outer recess 42 that serves as a finger pull-out. It may be protected by a sheath 43. The portion 40 may be connected to the housing 10 by a hinge 39 and may be kept normally closed by a magnetic latch 34.

Extending through the insulating layer 44 on the bottom side of the vessel 11 are metal members or conducting web 45 which give a *controlled* amount of conductivity between the pressure vessel 11 and a heat exchanger 46. The heat exchanger 46 comprises a sheet of aluminum or other suitable material, preferably about 12 mils thick, punched to provide a large number of openings 47 there-through. The sheet 46 may then be folded into the double-W shape shown or other suitable shape that assures good contact of the air which is to be cooled.

This air is preferably taken into the unit through two filters 50 and 51 and sent into a chamber 52 containing the sheet 46 by two blowers 53 and 54, operated by a motor 49. The two blowers 53 and 54 expel air into the relatively flat chamber 52 through which the heat exchanger transfer plate 46 extends. In order to assure even distribution, each blower 53, 54 may have its outlet lead to a pair of baffles 55, 56 or 57, 58 put at an angle outwardly, so that about one-third of the air is deflected inwardly between the pair, about one-third of the air deflected outwardly outside of each plate 55 or 58, and the other third goes through the somewhat enlarged area of the central portion between the baffles 56 and 57. The air is spread out evenly and rejoins so that substantially even distribution of the air is obtained widthwise of the cooling device. The air then passes through the many perforations 47 in the heat exchanger 46, which may be either punched holes 47, as shown, or may be mesh or fins or any other type of heat transfer element which is suitable. Good contact between the heat exchanger 46 and the conducting web 45 is maintained by welds 48 in either a seam or stitch weld or a series of spot welds which go widthwise across in each instance. As shown in the drawings, there may be four of these welds 48, one to each of the segments of the web 45, and there may be several of these webs 45 across the device. The exhausted air goes out through a grill 60 into the interior of the automobile or other space where the cooling is desired.

By maintaining a pressure of about 60 to 65 p.s.i., the carbon dioxide sublimes in the region of about $-70°$ F. This low temperature forms the basis of the conduction system, the heat from the air being taken by the heat exchanger 46 and transmitted through the web 45 to the casing 11 to the carbon dioxide block 13, and there used to heat the carbon dioxide by the withdrawn heat, leaving blown-through air cool. The sublimated carbon dioxide passes off through the valve 15 at the controlled leak rate, which depends upon the temperature of the air being cooled, and exhausts through the exhaust tube 24, which exhausts outside the automobile or other space to be cooled.

While the block 44 may be stationary, there are some advantages in making it movable relative to the vessel 11. With the web 45 and the block 44 movable as a unit and with the heat exchanger 46 welded to the web 45, the cooling effect of the device may be varied by varying the conduction between the vessel 11 and the web 45. For this purpose, the block 44 is made shorter than the space it is to fit in (or compressible therein), and the vessel 11 has its bottom wall 61 provided with a group of grooves 62, 63, so that if the position of the block 44 and web 45 are shifted, some of the web 45 is no longer in direct contact with the wall 61, and hence the conductivity between the vessel 11 and the heat exchanger 46 is varied. This adjustment may be made simpler by a rod 64 attached to the web 45 and passing through a slot 65 in the housing 10 to a control rod 66 having a handle 67 and a bearing support 68.

Also, the rod 66 may activate electrical controls 69 to vary the fan speed from low-speed fan and low conductivity, through high-speed fan and low conductivity through low-speed fan and high conductivity to high-speed fan and high conductvity. This may be done by having the rod 66 rotate for fan speed and move laterally for conductivity.

If desired, the unit may also be used as an air conditioner for filtering air, even when there is no cooling; that is, air is then simply taken in through the filters 50 and 51 and blown out by the blowers 53 and 54 through the passageway 52 and grille 60 without any actual cooling. If desired, the filters 52 and 51 may be used as the sole intake of air into the automobile by relatively easy attachments, or it may simply be used to circulate the air already there with reliance on windows for getting fresh air. In fact, the heat exchanger may be electrically heated, so that the device may be used as a heater.

The brackets 36 may be used to install the unit beneath the glove compartment or other portion of the instrument panel or wherever desired, and the entire devices takes up but little space. It may typically be only about a foot square by about five inches high, so that it takes up less than a cubic foot of space from the automobile, yet it gives quite effective operation. The discharge from the grille 60 may be located so that it does not go directly on the people concerned but goes out to one side at the front, and it may be deflected as desired by turning the blades of the grille.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A unitized air-conditioner and air-cooling system for an enclosed space, comprising:
   an outer housing having insulation means therein,
   a pressure vessel in said housing surrounded by said insulation means and defining an interior chamber for retention under pressure of a block of Dry Ice and having a sealed door and pressure-relief means,
   an exhaust conduit leading from said pressure relief means to a locus outside said space for exhausting the gas sublimited from said Dry Ice in said chamber,
   means defining a passageway spaced from said vessel by a block of said insulation means, said passageway having an outlet from said housing for cooled air,
   metal heat-conducting means associated with said block of insulation means connected to said vessel in heat-conductive relation to said chamber and leading to said passageway,
   a heat-exchange metal perforate baffle in said passageway exposing therein a large surface area and connected to said conducting means for conduction therebetween,
   blower means at the opposite end of said housing from said outlet for sending ambient air through said passageway to said outlet to cool the air,
   control means for the position of said heat-conducting means to give a plurality of positions therefor, and
   control means for the speed of said blower means to give a plurality of speed therefor.

2. A unitized air-conditioner and air-cooling system for an enclosed space, comprising:
   an outer housing having insulation means therein,
   a pressure vessel in said housing surrounded by said insulation means and defining an interior chamber for retention under pressure of a block of Dry Ice and having a sealed door and pressure-relief means,
   an exhaust conduit leading from said pressure relief means to a locus outside said space for exhausting the gas sublimated from said Dry Ice in said chamber,
   means defining a passageway spaced from said vessel by a block of said insulation means, said passageway having an outlet from said housing for cooled air,
   metal heat-conducting means associated with said block of insulation means connected to said vessel in heat-conductive relation to said chamber and leading to said passageway, a heat-exchange metal perforate baffle in said passageway exposing therein a large surface area and connected to said conducting means for conduction therebetween, and blower means at the opposite end of said housing from said outlet for sending ambient air through said passageway to said outlet to cool the air, said passageway being wider than the outlet of said blower means, and a series of baffle means which distributes the blower air uniformly across the passageway.

3. The system of claim 1 wherein said two control means are united into a single control system for varying both blower speed and the position of said heat-conducting means.

References Cited

UNITED STATES PATENTS

| | | | |
|---|---|---|---|
| 1,966,011 | 7/1934 | Hubbell | 62—387 |
| 1,993,013 | 3/1935 | Marr | 62—387 |
| 2,016,428 | 10/1935 | Hasche | 62—387 |
| 2,118,044 | 5/1938 | Gudmundsey | 62—387 |
| 2,196,310 | 4/1940 | Kubin | 62—384 |
| 2,677,245 | 5/1954 | Edmondson | 62—383 |
| 2,707,870 | 5/1955 | Edmondson | 62—383 |

WILLIAM J. WYE, Primary Examiner

U.S. Cl. X.R.

62—383, 387